Figure 1:
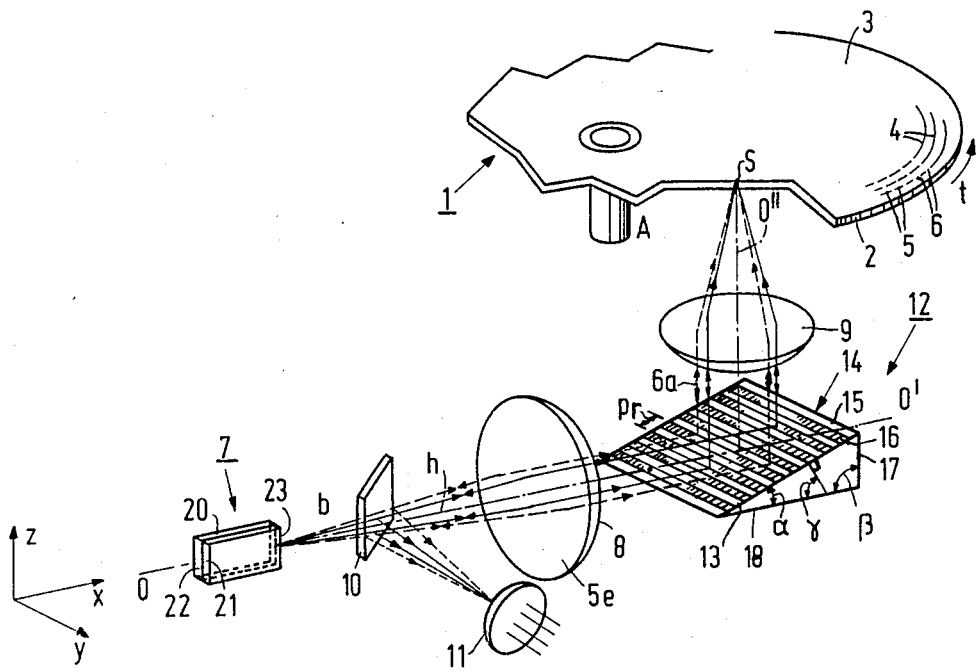

United States Patent [19]

Opheij et al.

[11] Patent Number: 4,826,270

[45] Date of Patent: May 2, 1989

[54] OPTICAL SCANNING APPARATUS

[75] Inventors: Willem G. Opheij; Louis-Marie H. Cobben, both of Eindhoven, Netherlands

[73] Assignee: U.S. Philips Corporation, New York, N.Y.

[21] Appl. No.: 173,912

[22] Filed: Mar. 28, 1988

[30] Foreign Application Priority Data

Jan. 11, 1988 [NL] Netherlands ............... 8800057

[51] Int. Cl.[4] ............... G02B 5/32; G02B 27/44
[52] U.S. Cl. ............... 350/3.72; 350/3.7; 350/162.23; 369/100; 369/109
[58] Field of Search ............... 350/3.7, 3.72, 162.23; 369/100, 103, 109

[56] References Cited

U.S. PATENT DOCUMENTS 4,355,858 10/1982 Funato et al. ............... 350/3.72
4,440,839 4/1984 Mottier ............... 350/162.23
4,760,565 7/1988 Jipson et al. ............... 369/109

Primary Examiner—Bruce Y. Arnold
Attorney, Agent, or Firm—Algy Tamoshunas

[57] ABSTRACT

An apparatus is described for optically scanning an information surface by moving said surface relative to a beam, which apparatus comprises a radiation source for supplying a beam, a collimator lens and an objective for focusing the beam to a spot in the information plane. The height of the apparatus can be reduced and/or a beam having an asymmetrical cross-section can be converted into a beam having a symmetrical cross-section by arranging a reflective diffraction grating with a suitable grating period between the collimator lens and the objective, while the angle of incidence between the normal on the grating and the chief ray of the scanning beam deviates considerably from 45°.

17 Claims, 5 Drawing Sheets

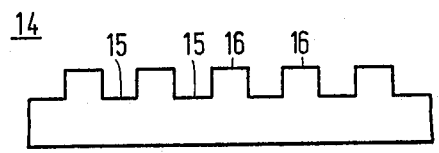
FIG.3
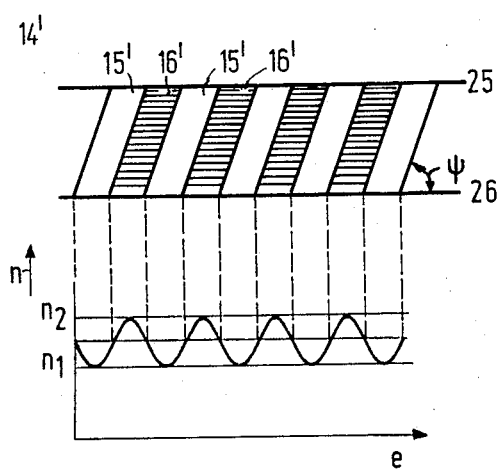
FIG.4
FIG.4a
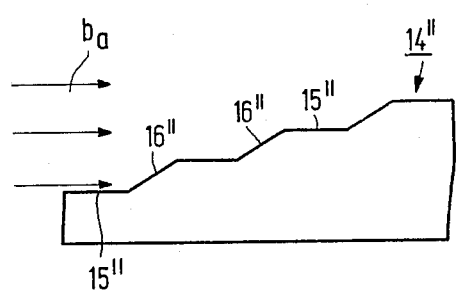
FIG.5

OPTICAL SCANNING APPARATUS

The invention relates to an apparatus for optically scanning an information surface, comprising a radiation source for supplying a scanning beam, a collimator lens and an objective for focusing the scanning beam to a scanning spot in the information plane.

The information surface may be a surface already provided with optically readable information, or a surface in which information is to be written. In the first-mentioned case the scanning beam is a read beam and in the second case the scanning beam is constituted by a write beam modulated with information to be written. Examples of the above-mentioned apparatus are a read apparatus for an optical audio or video disc known as "CD" and "Laservision" player, respectively, or a combined write and read apparatus for an optical disc, but also a laser printer.

"Philips' Technical Review", Vol. 33, No. 7, (1973) pages 186–189 describes an apparatus for reading an optical record carrier having an information structure located in an information plane and arranged in information tracks. In this apparatus the path of the scanning beam, whose chief ray extends in a horizontal direction, incorporates a reflector reflecting this scanning beam in such a way that the principal axis of the reflected beam extends at an angle of 90° to that of the beam incident on the reflector. The record carrier is located above the radiation source and reflector and the principal axis of the scanning beam is perpendicular to this record carrier. The scanning beam is focused on the information plane by an objective arranged between the reflector and the record carrier. The said reflector is pivotally arranged and is used to correct the position of the scanning spot in the radial direction of the round disc-shaped record carrier in such a way that this spot keeps following an information track to be scanned.

More recent developments in optical scanning apparatus, particularly those which are intended for reading an optical audio "CD" record have resulted in a compact and elongate read unit which is described, for example, in "Philips' Technical Review", Vol. 40 (1982), no.6, pages 151–155. This read unit, or light pen, which comprises both the radiation source and all required optical components and the radiation-sensitive detection system, is mounted on a pivotal arm by means of which the radial position of the scanning spot in the information plane can be adjusted. The light pen has a relatively small height, for example, 45 mm and is successfuly used in present-day CD players for domestic use.

For special uses, for example, in portable players or in players to be mounted in motor cars, it is desirable to reduce the mounting height of the optical scanning unit considerably. To this end the light pen may be replaced by a scanning unit in which the largest part of the radiation path extends in the horizontal direction and in which use is made of a reflector to reflect the scanning beam in the vertical direction towards the record carrier. This reflector extends at an angle of 45° to the chief ray of the beam incident thereon and to that of the reflected beam. There is a need to reduce the height of this type of read apparatus to a still further extent.

In analogy with the known magnetic discs memory, an optical disc memory in which a plurality of optical disc-shaped record carriers are placed one over the other may be used for storing larger quantities of data. For each record carrier there is one, or there are two separate scanning units for writing and reading the relevant record carrier. Also for this use it is desirable that the height of the scanning unit is as small as possible so that the record carriers can be placed close together.

In modern scanning apparatus for optical record carriers, but also in, for example, laser printers a diode laser, for example, an AlGaAs diode laser is preferably used as a radiation source. Such a laser comprises a plurality of p and n-type semiconductor layers, inter alia, a so-called active layer in which laser radiation is generated if an electric current of sufficient magnitude is passed through the diode laser in a direction transversely to the layers. The laser radiation is emitted on the front side, or front facet, from the active layer, the principal axis of the laser beam being parallel to this layer. The radiation-emitting surface of the diode laser is rectangular, whilst the dimension in the direction parallel to the active layer, the so-called lateral direction, is larger than the dimension in the direction transversely to the active layer, the so-called transversal direction. The aperture angle of the laser beam in the lateral plane is smaller than that in the transversal plane. This beam therefore has an elliptical cross-section.

In connection with the desired high information density in optical record carriers the scanning spot formed in the information plane must be round, have a minimum diameter and be diffraction-limited. Such a spot can only be obtained if the beam entering the objective has a round cross-section of such diameter that the pupil of the objective is well-filled. Also for a laser printer it is desirable that the radiation spot formed on the recording medium is round. To obtain a diode laser beam with a round cross-section a so-called beam shaper must be arranged in the path of this beam.

The present invention has for its object to provide an optical scanning apparatus for the various uses mentioned in which the said requirements of minimum height of the apparatus and optimum beam shaping are met, both separately and jointly. This apparatus is characterized in that a reflective diffraction grating is arranged in the radiation path between the collimator lens and the objective, the angle of incidence between the normal on the grating and the chief ray of the scanning beam differing considerably from 45°, and the period of the grating and the angle of incidence being such that only a sub-beam diffracted by the grating in a higher order can pass through the objective.

A higher order is understood to mean the first, the second and the further diffraction orders of the grating.

By suitable choice of the diffraction orders in combination with a suitable choice of the angle of incidence it is achieved that the diffraction grating behaves for the selected order sub-beam as a mirror at 45° which reflects this sub-beam at an angle of 90° to the incident beam, although the grating is actually positioned with respect to the radiation beam at an angle which differs considerably from 45°. This effect can be utilized in two ways.

A first use of the inventive idea is realized in an apparatus which is further characterized in that the angle of incidence of the scanning beam is considerably larger than 45° and smaller than 90°. Consequently, the height of the apparatus is reduced considerably. This is particularly important when using the said apparatuses for scanning optical disc-shaped record carriers.

A second use of the inventive idea is realized in an apparatus in which the radiation source is a diode laser having an active layer emitting a laser beam whose aperture angle in the lateral plane, through the principal axis of the laser beam and parallel to the active layer, is smaller than the aperture angle in the transversal plane, through the principal axis of the laser beam and transversely to the active layer. This apparatus is characterized in that the strips of the grating are transverse to one of the planes, the lateral plane and the transversal plane, and in that the angle of incidence is such that the beam reflected by the grating in the selected order has a round cross-section. The scanning spot formed by the objective in the information plane is then round despite the non-round cross-section of the beam emitted by the diode laser.

A first embodiment of the apparatus in which the reflection grating is used as a beam shaper is further characterized in that the grating strips are transverse to the transversal plane and in that the angle of incidence is larger than 0° and considerably smaller than 45°. The cross-section of the beam in the transversal plane is then reduced in such a way that it will be equal to that in the lateral plane. This embodiment may be used if the scanning spot need not be very small, for example, in a laser printer.

If the scanning spot must be very small, of the order of 1/μm, for example in an apparatus for scanning optical disc-shaped record carriers, use is made of a second embodiment which is characterized in that the grating strips are transverse to the lateral plane and in that the angle of incidence is considerably larger than 45° and smaller than 90°. The beam is then widened in the lateral plane and rendered equal to the cross-section of the beam in the transversal plane. Moreover, the mounting height of an apparatus according to this embodiment is very small.

The above-mentioned scanning apparatuses comprising a diffraction grating for different purposes are preferably further characterized in that the diffraction grating is a phase grating. Such a grating has a higher efficiency than an amplitude grating.

The scanning apparatuses may be further characterized in that the phase grating is constituted by a profile grating consisting of grating grooves alternating with grating strips. Such a grating may be manufactured in bulk quantities at low cost by means of known pressing or replica techniques, starting from a grating mould.

The scanning apparatused may alternatively be characterized in that the phase grating is a volume grating comprising a plurality of juxtaposed bars alternately having a first average refractive index and a second average refractive index.

A volume grating is a so-called thick grating in which the grating structure extends across the thickness of the grating plate and is not only provided on the surface as is the case with a "thin" grating. An example of the said volume grating is a so-called volume hologram grating. This is a special type of diffraction grating obtained by causing two radiation beams which extend at a given angle to each other to be incident on the two different sides of a thick plate of special photographic material. These beams constitute in the plate a depth interference pattern of bars alternately having a high and a low intensity. The photographic material is chosen to be such that after development the two exposure levels are converted into different refractive indices. A very high efficiency can be achieved with such a volume hologram.

In order to limit as much as possible the radiation loss which is inherent in the use of a diffraction grating and is caused by the distribution of the radiation over the different diffraction orders, the scanning apparatuses are further characterized in that the grating parameters determining the intensity distribution over the different diffraction orders are chosen to be such that a maximum percentage of the incident radiation intensity is bended into the selected diffraction order.

In the case of a profile grating the said parameters are the ratio between the width of the grating grooves and those of the grating strips, the depth of the grating grooves and the edge steepness of these grooves. A grating which is optimized for a given diffraction order is referred to as a "blazed" grating in the literature. Such a grating often has a sawtooth-shaped profile without portions transversely to the direction of incidence.

In the case of a volume hologram the parameters determining the intensity distribution are the ratio between the width of the bars with the first refractive index and those of the bars with the second refractive index, the ratio of the refractive indices, the thickness of the bars and the angle, in the plane transversely to the longitudinal direction of the grating bars, between these bars and the direction of incidence.

The scanning apparatus may further be characterized in that a sub-beam diffracted in one of the first diffraction orders passes through the objective system. The sub-beams diffracted in the first order have of themselves a higher intensity than the higher diffraction order beams without optimization of the grating for this order. Due to the said optimization one of the first-order sub-beams may be further intensified at the set of the sub-beams of the other orders.

The possibility of optimizing the grating for a second or higher diffraction order is very advantageously used in another embodiment of the scanning apparatus which is characterized in that a second or higher order sub-beam passes through the objective system. If the selected sub-beam has an identical diffraction angle, the period of the diffraction grating can be increased, which facilitates the manufacture of the grating with the required accuracy. If the grating period remains equal, the angle of incidence of the beam can be increased so that the height of the scanning apparatus can be still further reduced.

To facilitate handling and positioning of the diffraction grating, a further embodiment is characterized in that the diffraction grating is arranged on the oblique side of a triangular prism having a straight angle, the other two sides of which are perpendicular to the incident beam and to the sub-beam directed towards the objective, respectively.

In the embodiments of the scanning apparatus described so far an objective having a given thickness is arranged in the radiation path between the diffraction grating and the information surface. By integrating the objective and the diffraction grating in one element, the height may be further reduced notably of scanning apparatuses intended for reading and/or writing disc-shaped optical record carriers. Consequently, a novel class of scanning apparatuses is obtained which are characterized in that the surface of the prism, opposed to the diffraction grating and through which the sub-beam reflected by the grating emerges, is curved.

A first embodiment of this class of scanning apparatuses is characterized in that the curved surface is an aspherical surface and in that the diffraction grating is a linear grating. In this embodiment the objective function is entirely fulfilled by the curved prism surface. In order that the scanning spot formed by this surface is free from aberrations, this surface should have an aspherical profile. An aspherical surface is a surface whose basic shape is spherical but whose actual shape has small deviations for correcting aberrations which may be produced in the scanning apparatus. When using such an aspherical surface the diffraction grating may be linear, that is to say, it may have straight grating strips and a constant grating period.

A second embodiment of the scanning apparatus with an integrated grating-objective element is characterized in that the curved surface is spherical and in that the grating has an aberration-correcting asphericity. This grating has very slightly curved grating lines and a substantially constant grating period. Such a grating may be manufactured, for example, holographically, that is to say, by causing two beams to interfere with each other in a holographic material. Since the grating only needs to correct for the spherical aberrations, it is only different from a linear grating to a slight extent.

A third embodiment of the scanning apparatus with an integrated grating-objective element is characterized in that the curved surface is spherical and in that the grating has a lens action and an aberration-correcting asphericity. The curved prism surface then does not need to produce the total required lens power but a part thereof is supplied by the grating. This grating has slightly curved grating strips whose curvative as well as the grating period varies to a small extent.

A final embodiment of the scanning apparatus with an integrated grating-objective element is characterized in that the objective and the grating are constituted by an objective grating and in that the prism surface facing the grating objective is flat. This objective grating has considerably curved grating strips whose curvature as well as the grating period vary considerably.

Figure 2:
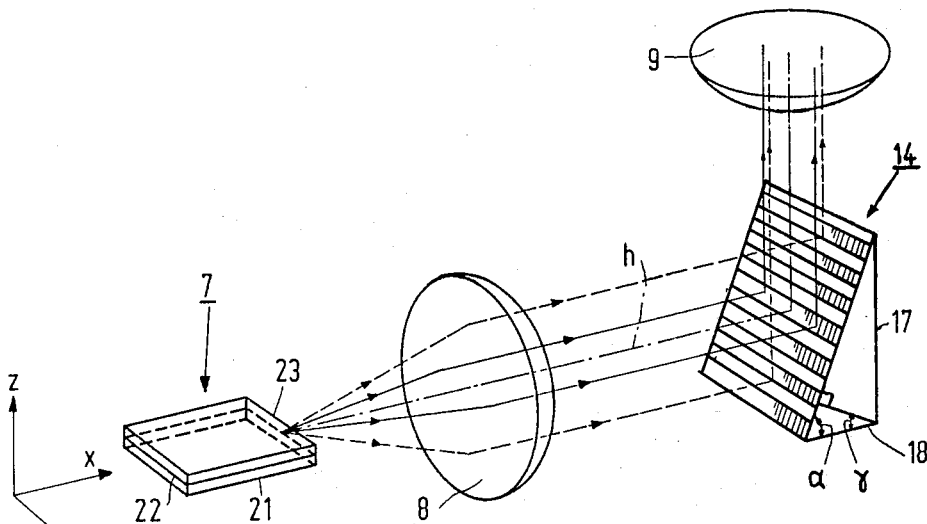
Figure 6:
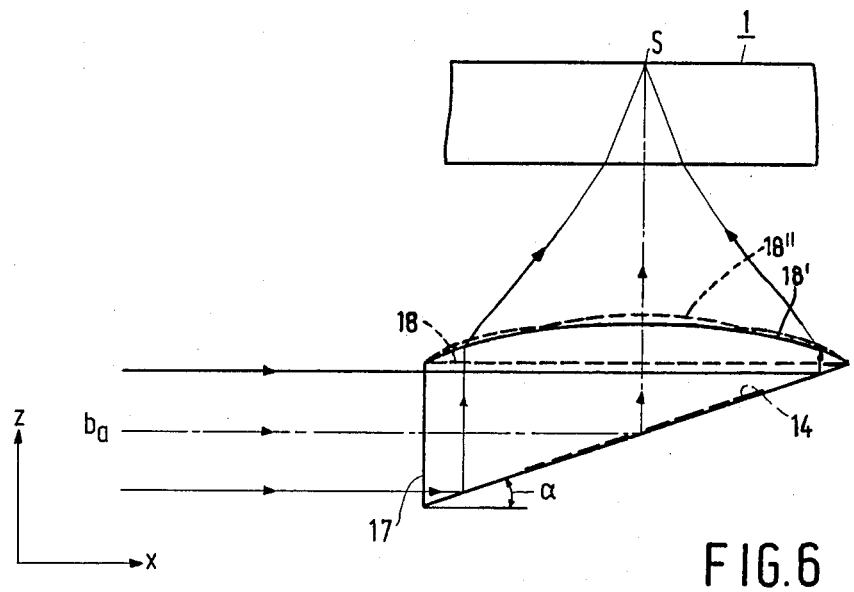
Figure 7:
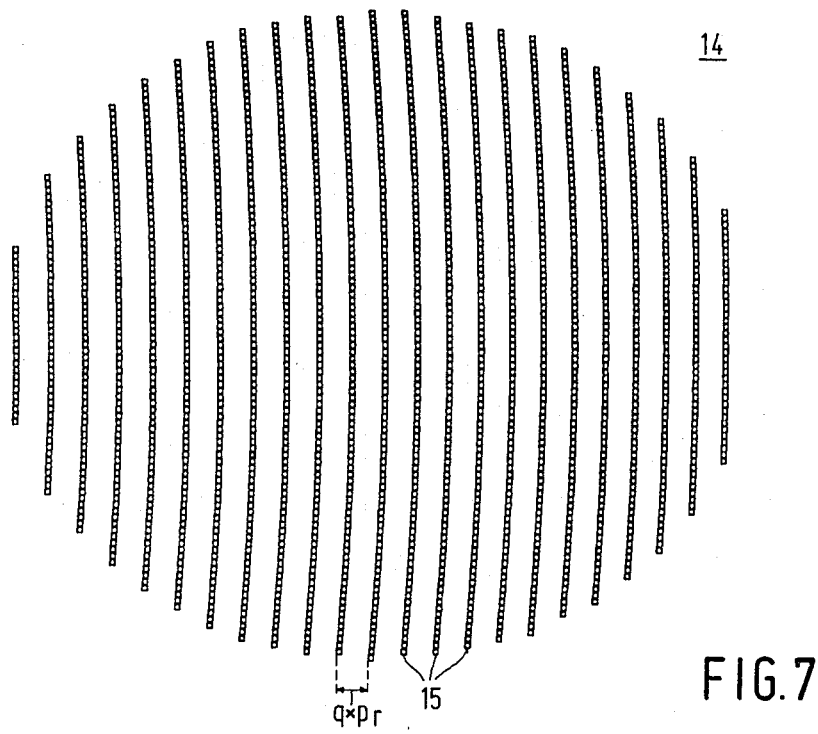
Figure 8:
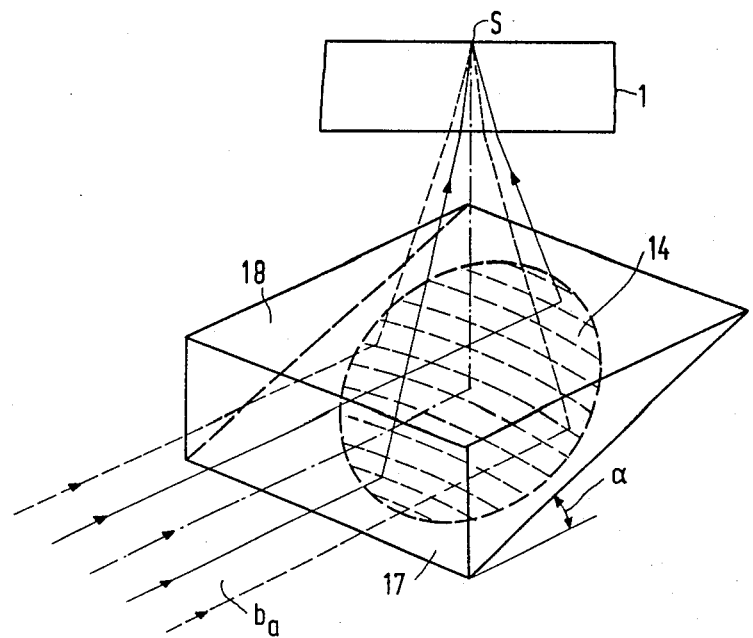
Figure 9:
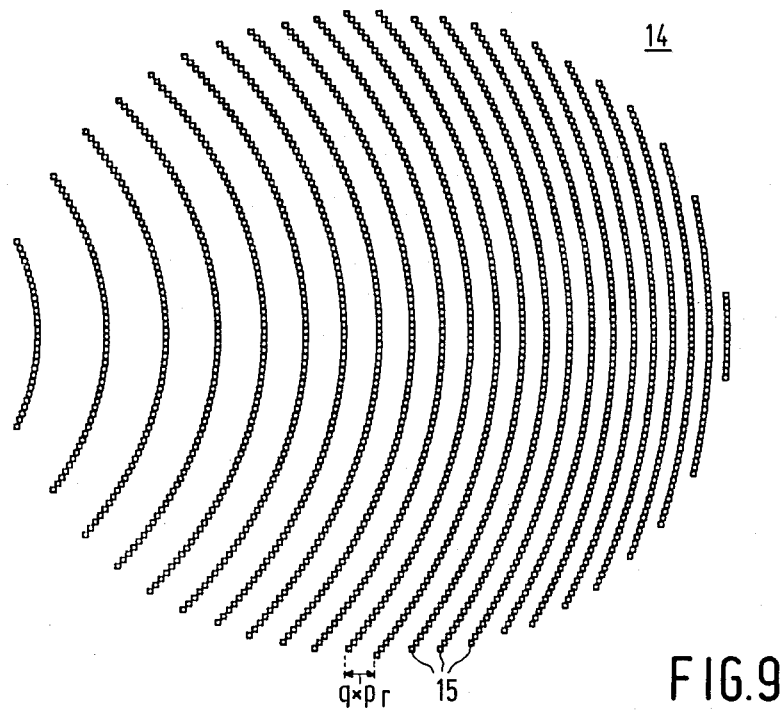
Figure 10:
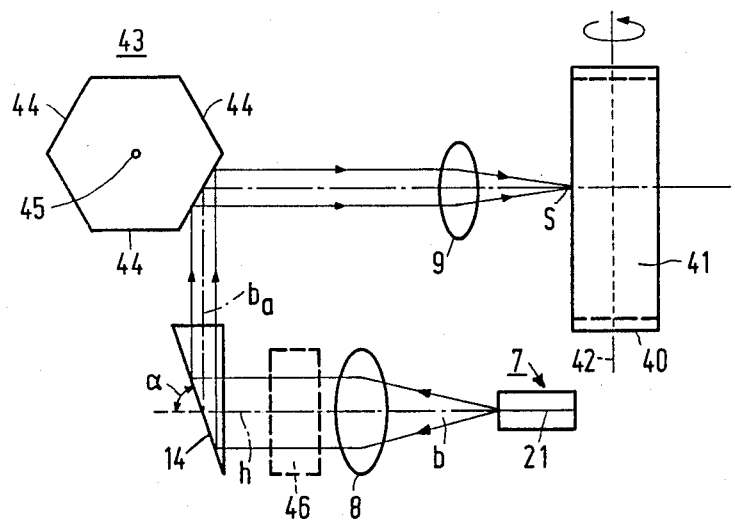

The invention will now be described in greater detail, by way of example, with reference to the accompanying drawings in which FIG. 1 is a diagrammatic perspective view of an apparatus for reading a disc-shaped record carrier comprising a scanning apparatus according to the invention with a linear diffraction grating, FIG. 2 is a perspective view of a part of a scanning apparatus in which a diffraction grating is used to narrow a beam in one direction, FIGS. 3, 4 and 5 show different embodiments of a phase grating, FIG. 6 is a lateral cross-section of a prism having a curved surface and a diffraction grating for use in the scanning apparatus, FIG. 7 is a front elevation of this grating, FIG. 8 is a perspective view of a prism having straight surfaces and a holographic grating for use in the scanning apparatus, FIG. 9 is a front elevation of the holographic grating, and FIG. 10 is a transversal cross-section of a laser printer comprising a scanning apparatus according to the invention.

FIG. 1 shows a part of a round disc-shaped record carrier 1. The information structure is indicated by the information tracks 4 located in an information surface 3 and comprising a large number of information areas 5 alternating with intermediate areas 6 in the track direction t. The information structure is preferably provided in the upper side of the record carrier and is read by a scanning beam b passing through the substrate 2. The scanning beam is supplied by a radiation source 7, for example, a semiconductor diode laser such as an AlGaAs laser.

The scanning beam b is focused by an objective 9 to form a scanning spot S in the information plane. Between this objective and the diode laser there is arranged a collimator lens 8 converting the diverging beam emitted by the diode laser into a parallel beam having such a cross-section that the pupil of the objective is adequately filled so that the scanning spot S is diffraction-limited and has a minimum diameter. The read beam is reflected by the information surface and, if the record carrier is rotated by means of the driving shaft A, it is modulated in accordance with the information stored in a track 4 to be read.

A beam splitter 10, for example, in the form of a semi-transparent mirror is arranged in the radiation path, which splitter passes the beam b emitted by the radiation source 7 to the objective and reflects the modulated beam from the record carrier to a radiation-sensitive detection system 11. This detection system supplies an electric signal which is modulated in conformity with the information stored in a track to be read. The detection system may also supply signals representing deviations in the position of the radiation spot with respect to a track to be read and/or focusing errors as described in the above-cited "Philips' Technical Review" Vol. 40, no. 6, pages 151–155.

As is known, a polarization-sensitive splitting prism may alternatively be used as a beam splitter instead of a semi-transparent mirror. A birefringent plate should then be arranged in the radiation path between this beam splitter and the objective, which plate ensures that the direction of polarization of the beam returning from the record carrier is rotated through 90° with respect to the direction of polarization of the beam emitted by the source.

The chief ray h of the beam b which is emitted by the source 7 and is passed by the element 10 and passes through the element 8 is located in a horizontal plane. The chief ray of the returning beam which has passed the collimator lens 8 and which is reflected by the beam splitter 10 is also located in this plane. A reflector 12 reflecting the scanning beam at an angle of approximately 90° in the direction of the record carrier is arranged in the radiation path behind the collimator lens. This construction of the scanning apparatus yields a mounting height which is considerably smaller than that of known scanning systems in which the elements 7, 8 and 10 and the objective are arranged in one line transversely to the record carrier.

According to the invention the height of the apparatus may be still further reduced by using a reflective diffraction grating as a reflector, as is shown in FIG. 1, and by making the plane of this grating extend at a small angle of inclination $\alpha$ to the chief ray h of the beam b. In FIG. 1 the grating 14 is indicated by means of the grating strips 15 and the intermediate strips 16. For the sake of clarity only a small number of strips 15 and 16 is shown in FIG. 1, but in reality the grating comprises a large number of strips. In the plane XZ perpendicular to the direction of the grating strips, this grating splits the incident beam b into a non-diffracted zero-order subbeam, that is to say, a beam for which the angle of incidence is equal to the angle of reflection, two sub-beams of the +1 order and −1 order, respectively, and a plurality of second and higher order sub-beams. The grating period $p_r$ and the angle of inclination $\alpha$ may be chosen to be such that one of the first or higher order sub-beams passes through the pupil of the objective 9. For the sake of clarity FIG. 1 only shows this one sub-beam $b_a$.

The mounting height of the diffraction grating, which height is determined by an angle of inclination $\alpha$ or by the angle of incidence $\gamma = 90° - \alpha$, is considerably smaller than the mounting height of a mirror at an angle of 45°.

A diode laser, such as an AlGaAs diode laser, is preferably used as a radiation source in read and/or write apparatuses for disc-shaped optical record carriers. Such a laser comprises a plurality of layers 20, 22 of p-type and n-type semiconductor material, respectively, and a so-called active layer which is denoted by 21 in FIG. 1. The plane parallel to this active layer is hereinafter referred to as the lateral plane. This is the plane XZ in FIG. 1. The plane perpendicular to the lateral plane, plane YZ in FIG. 1, is referred as the transversal plane.

As is known, the beam b emerging from the front facet 23 of the diode laser is not symmetrical; the aperture angle of this beam in the lateral plane is considerably smaller than the aperture angle in the transversal plane, as is shown in FIG. 1. In this Figure the border rays of the beam in the lateral plane are denoted by solid lines and the border rays of the beam in the transversal plane are denoted by broken lines. The beam b has an elliptical cross-section $S_c$ at the location of the collimator lens. To obtain a round radiation spot S on the information surface 3, the beam must be shaped to a beam having a round cross-section.

As is shown in FIG. 1, the desired beam shaping can be realized by means of the diffraction grating 14 at a small angle of inclination $\alpha$ or a large angle of incidence $\gamma$. Since the chief ray h of the beam b extends at a relatively small angle $\alpha$ to the reflective surface 13 in the lateral plane, whilst the sub-beam $b_a$ is reflected in a substantially vertical direction, the last-mentioned beam is considerably widened with respect to the incident beam b in the lateral plane. While adapting the period $p_r$ of the grating, the angle of inclination $\alpha$ may be chosen to be such that after reflection at the surface 13 the lateral width of the beam is equal to the transversal width which is not influenced by the grating.

In the apparatus according to FIG. 1 two requirements are simultaneously met by the reflective diffraction grating, namely reducing the mounting height and widening the beam in the lateral plane. However, it is entirely within the scope of the present invention to use the diffraction grating only for reducing the height of the apparatus, for example, if a radiation beam having a round cross-section is used, or to use it only as a beam shaper.

This beam shaper, shown in FIG. 1, increases the cross-section of the beam in the lateral plane so that the beam facing the objective is a relatively wide, round beam. This is particularly attractive if the objective must form a relatively small scanning spot, for example, with a diameter of the order of $1/\mu m$. Such an objective has a relatively large numerical aperture, for example, of the order of 0.4 to 0.5 which must be entirely filled. In other applications in which, for example, the radiation spot formed by the objective may be larger, as in a laser printer, an asymmetrical beam may be shaped to a beam with a round cross-section by reducing the width of the beam in the transversal plane.

This situation is shown in FIG. 2. In this Figure the diode laser is rotated through 90° with respect to that shown in FIG. 1 so that the active layer is in the XY plane. The border rays of the beam in the lateral plane (XY plane) are denoted by solid lines and those in the transversal plane (XZ plane) are denoted by broken lines. The reflective grating 14 now extends at a large angle of inclination $\alpha$ of the order of, for example, 70° to the lateral plane, and in the transversal plane the angle of incidence $\gamma = 90° - \alpha$, at which the chief ray h of the beam b extends to the normal on the plane of the grating is small. As is shown in FIG. 2 the beam is narrowed in the transversal plane due to reflection on the grating, whereas the width in the lateral plane does not change. It can be ensured again that the beam reflected by the grating has a round cross-section by suitable choice of the angle of inclination $\alpha$ and the period $p_r$ of the grating.

The invention has hitherto been described with reference to a read apparatus. However, the invention may also be used in a write apparatus which principally has the same structure as the read apparatus. The scanning beam must then be modulated with the information to be written. This can be realized by means of an optical modulator in the radiation path or by controlling the diode laser by means of a control signal which is modulated in conformity with the information to be written.

The diffraction grating is preferably arranged on a triangular prism the other two surfaces of which are denoted by 17 and 18 in FIG. 1. The angle $\beta$ between the surfaces 17 and 18 is preferably 90° which facilitates alignment and mounting of the grating.

The diffraction grating may be an amplitude grating and may comprise reflective strips 15 and absorbing or radiation-transmissive strips 16. Preferably, however, the diffraction grating is a phase grating. Such a grating yields a higher diffraction efficiency as compared with an amplitude grating. The phase grating may be in the form of a so-called profile grating comprising, for example, grating grooves 15 and higher located grating strips 16, as is shown in FIG. 3. Such a grating has the advantage that it can be manufactured in bulk quantities at low cost by means of known pressing an replica techniques if a mould in which the grating structure is provided is available. Such a mould need only be manufactured once.

The phase grating may alternatively be formed by a structure of juxtaposed bars alternately having a first and a second refractive index. This structure may have the shape of a so-called volume hologram or thick hologram having a thickness of the order of several mm.s. Such a hologram is obtained by making two beams incident on a thick plate of special photographic material. Dependent on whether a reflection or volume hologram is to be obtained, the beams must be incident on different sides or on the same side of the plate. Within this plate the beams interfere with one another so that a structure of juxtaposed bars alternately having a high and low intensity is produced. By developing the plate the intensity pattern is converted into a pattern of bars having higher and lower refractive indices. FIG. 4 shows such a volume hologram 14' in a diagrammatic cross-section.

The difference $\Delta n$ between the refractive index $n_1$ of the strips 15' and the refractive index $n_2$ of the strips 16' is, for example, 0.02 and $n_1$ and $n_2$ have values of, for example, 1.52 and 1.54, respectively. In most cases the strips will extend at an angle $\phi$ deviating from 90° to the two sides 25 and 26 of the plate 14'.

Moreover, the transitions between the areas having different refractive indices will generally not be so abrupt in practice as is shown in FIG. 4, but the refractive index has a more gradual variation as is shown in FIG. 4a. In this Figure the position on the plate transversely to the strips of FIG. 4 is plotted horizontally and the refractive index n is plotted vertically.

The beam $b_a$ passing through the objective may be one of the first-order sub-beams. These sub-beams have a higher intensity than the higher order sub-beams. For a sub-beam of the order m diffracted by a diffraction grating it holds for the diffraction angle $\delta$ that $$\sin\delta = \frac{\lambda \cdot m}{p_r}$$

If a sub-beam of, for example, the second order is chosen for the sub-beam $b_a$, the period $p_r$ of the grating 14 is twice as large at the same diffraction angle $\delta$ than if a sub-beam of the first order is chosen. Under circumstances it is therefore preferable to choose a second or higher order sub-beam because the diffraction grating can then be manufactured more easily with the required accuracy.

Both in the case when a second or higher diffraction order sub-beam is selected and in the case when a first-order sub-beam is selected the efficiency of the grating for the selected sub-beam can be increased by adapting the grating parameters. The efficiency is herein understood to mean that part of the radiation intensity incident on the grating which is diffracted in the selected order. In the case of a profile grating the said parameters are the depth of the grating grooves 15, the wall steepness of these grooves and the ratio between the width of the grooves 15 and those of the intermediate grooves 16. Optimizing the grating parameters of a profile grating is known as "blazing". FIG. 5 shows in a simplified form a small part of an embodiment of such a "blazed" grating 14". It has been ensured, inter alia, that the parts of the incident radiation beam $b_a$ are incident as much as possible on areas 16" reflecting the radiation in the desired direction.

Also for a refractive index grating like a volume hologram according to FIGS. 4 and 4a the efficiency for the selected diffraction order can be maximized by an optimum choice of the refractive index difference $\Delta n$, the angle of inclination $\phi$ of the bars and the ratio between the widths of the strips 15' and 16'.

Due to the small angle of inclination $\alpha$ or the large angle of incidence $\gamma$ in the embodiment of FIG. 1, which makes the height of the diffraction grating small and also increases the beam width in the lateral plane, the height of the scanning apparatus is reduced with respect to that of a scanning apparatus having a reflector at an angle of 45°. However, in this embodiment space should be reserved in the vertical direction for the objective between the diffraction grating 14 and the information surface 3.

An embodiment which is even more favourable as regards the mounting height is that in which the objective and the diffraction grating are integrated in one element. FIG. 6 shows a first embodiment of such an element. This Figure shows in a lateral cross-section a triangular prism having a straight angle and with a diffraction grating 14 being arranged on the oblique side. The prism of FIG. 6 is oriented differently than the prism of FIG. 1, namely such that the beam $b_a$ enters the prism via the surface 17 and leaves the prism via the surface 18' after reflection by the grating. This exit face is not a flat surface like surface 18 in FIG. 1 but a curved surface which has a lens action due to its curvature and may therefore replace the objective 9 of FIG. 1.

As described in, inter alia, U.S. Pat. No. 4,668,066 the objective in a scanning apparatus for disc-shaped record carriers may comprise a single lens element. However, this element should then at least have one aspherical surface in order to be able to form a scanning spot which is free from aberration. Such a correction will also have to be introduced in the objective diffraction grating element of FIG. 6. This is possible by giving the curved surface an aspherical shape 18" as indicated by the broken line curve, instead of a spherical shape 18'. In this case the grating is a linear grating, that is to say, a grating having straight grating strips and a constant grating period.

However, it is alternatively possible that the curved surface is a spherical surface 18' and that the aberration correction is ensured by the diffraction grating 14. A grating which is suitable for this purpose has a linear central portion and border portions with durved grating strips and a varying grating period.

The diffraction grating can also be given some optical power or lens action by curving the grating strips to a somewhat greater extent, the curvature in the centre of the grating being slightly larger than that at its edge. Moreover, the period of this grating slightly decreases from one end to the other end. FIG. 7 shows an embodiment of this grating in a front elevation. In this Figure only one grating strip 15 is shown each time for a number of grating periods. The distance between the slightly curved lines 15 is thus equal to a number of (q) times the grating period $p_r$. When using such a grating the curved surface 18' or 18" may have less lens action and the radius of curvature of this surface may be larger.

Finally it is possible to give the diffraction grating so much lens action that it also functions as an objective i.e. an "objective grating". The exit face of the prism can then be a flat surface 18 as is shown in FIG. 8. This Figure is a perspective view of the prism with the flat surfaces 17 and 18 which extend at an angle of, for example, 90° to each other, with the diffraction grating 14 arranged on the oblique side. An embodiment of this grating is shown in a front elevation in FIG. 9. The grating has considerably curved grating strips whose radius of curvature increases uniformly in one direction. The grating period decreases considerably in the same direction. FIG. 9 also shows only one grating strip 15 each time over a number of grating periods. The grating according to FIG. 9 may be manufactured holographically by exposing a photographic plate at the position of this grating with a diverging beam from a point source at the position of the radiation spot S and the beam corresponding to the beam $b_a$. The grating according to FIGS. 8 and 9 may also be referred to as a holographic objective grating.

FIG. 10 shows diagrammatically a laser printer comprising a radiation-sensitive recording medium 41 which is carried by a drum 40. For writing successive lines the drum is rotated about its axis 42. A line is scanned by means of a polygon 43 having a number of mirror facets 44 and rotating about its axis 45. The reference numeral 9 denotes an objective which must focus the radiation from the diode laser 7, with active layer 21 and reflected by a mirror facet, to form a write spot S on the recording medium. The radiation is intensity-modulated in accordance with the information to be written by means of the electric control current through the diode laser or by means of a separate intensity modulator in the radiation path.

The radiation beam b supplied by the diode laser is converted into a parallel beam by the collimator lens 8 and is subsequently reflected to the polygon by the diffraction grating 14. FIG. 10 shows the laser printer in a transversal cross-section. The beam $b_a$ entering the objective via the polygon is narrowed in the plane of this cross-section because the grating 14 extends at a large angle of inclination $\alpha$ to the chief ray h of the beam b.

The fact that the invention has been described with reference to apparatuses for writing or reading information does not mean that it is limited thereto. The invention may be used wherever a radiation path must be folded so that the mounting height is small and/or wherever a radiation beam having an asymmetrical cross-section must be converted into a beam having a symmetrical cross-section.

What is claimed is:

1. An apparatus for optically scanning an information surface by moving said surface relative to a beam, comprising a radiation source for supplying a beam, a collimator lens and an objective for focusing the beam to a spot in the information plane, characterized in that a reflective diffraction grating is arranged in the radiation path between the collimator lens and the objective, the angle of incidence between the normal on the grating and the chief ray of the beam deviating considerably from 45°, and the period of the grating and the angle of incidence being such that only a sub-beam diffracted by the grating in a higher order can pass through the objective.

2. An apparatus as claimed in claim 1, characterized in that the angle of incidence of the beam is considerably larger than 45° and smaller than 90°.

3. An apparatus as claimed in claim 1, in which the radiation source is a diode laser having an active layer emitting a laser beam whose aperture angle in the lateral plane, through the principal axis of the laser beam and parallel to the active layer, is smaller than the aperture angle in the transversal plane, through the principal axis of the laser beam and transversely to the active layer, characterized in that the strips of the grating are transverse to one of the lateral plane and the transversal plane, and in that the angle of incidence is such that the beam reflected by the grating in the selected order has a round cross-section.

4. An apparatus as claimed in claim 3, characterized in that the grating strips are transverse to the transversal plane and in that the angle of incidence is larger than 0° and considerably smaller than 45°.

5. An apparatus as claimed in claim 3, characterized in that the grating strips are transverse to the lateral plane and in that the angle of incidence is considerably larger than 45° and smaller than 90°.

6. An apparatus as claimed in claim 1, characterized in that the diffraction grating is a phase grating.

7. An apparatus as claimed in claim 6, characterized in that the phase grating is constituted by a profile grating.

8. An apparatus as claimed in claim 6, characterized in that the phase grating is volume grating comprising a plurality of juxtaposed bars alternately having a first average refractive index and a second average refractive index.

9. An apparatus as claimed in claim 1, characterized in that the grating parameters determining the intensity distribution over the different diffraction orders are chosen to be such that a maximum percentage of the incident radiation intensity is diffracted into the selected diffraction order.

10. An apparatus as claimed in claim 1 or 9, characterized in that a sub-beam diffracted in one of the first diffraction orders passes through the objective system.

11. An apparatus as claimed in claim 1 or 9, characterized in that a second or higher order sub-beam passes through the objective system.

12. An apparatus as claimed in claim 1, characterized in that the diffraction grating is arranged on the oblique side of a triangular prism having a right angle, the other two sides of which are perpendicular to the incident beam and to the sub-beam directed towards the objective, respectively.

13. An apparatus as claimed in claim 12, characterized in that the surface of the prism, opposite the diffraction grating and through which the sub-beam reflected by the grating emerges, is curved.

14. An apparatus as claimed in claim 13, characterized in that the curved surface is an aspherical surface and in that the diffraction grating is a linear grating.

15. An apparatus as claimed in claim 13, characterized in that the curved surface is spherical and in that the grating has an aberration-correcting asphericity.

16. An apparatus as claimed in claim 13, characterized in that the curved surface is spherical and in that the grating has a lens action and an aberration-correcting asphericity.

17. An apparatus as claimed in claim 12, characterized in that the objective and the grating are constituted by an "objective grating" and in that the prism surface facing the "objective grating" is flat.

* * * * *